US006704848B2

(12) United States Patent
Song

(10) Patent No.: US 6,704,848 B2
(45) Date of Patent: Mar. 9, 2004

(54) APPARATUS FOR CONTROLLING TIME DEINTERLEAVER MEMORY FOR DIGITAL AUDIO BROADCASTING

(75) Inventor: Hwan-Seok Song, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 99 days.

(21) Appl. No.: 09/866,864

(22) Filed: May 30, 2001

(65) Prior Publication Data

US 2002/0046329 A1 Apr. 18, 2002

(30) Foreign Application Priority Data

Aug. 30, 2000 (KR) ........................................ 2000-50700

(51) Int. Cl.[7] ................................................ G06F 12/00
(52) U.S. Cl. ........................ 711/157; 714/701; 714/784
(58) Field of Search .......................... 711/157; 345/503, 345/557; 714/784, 746, 776, 701

(56) References Cited

U.S. PATENT DOCUMENTS 5,377,207 A * 12/1994 Perlman ..................... 714/784
5,559,952 A * 9/1996 Fujimoto .................... 345/557
5,657,478 A * 8/1997 Recker et al. .............. 345/503
5,828,671 A * 10/1998 Vela et al. .................. 714/701
5,943,371 A * 8/1999 Beale et al. ................ 375/341
5,991,857 A * 11/1999 Koetje et al. ............... 711/157

* cited by examiner

*Primary Examiner*—Nasser Moazzami
(74) *Attorney, Agent, or Firm*—Sughrue Mion, PLLC

(57) ABSTRACT

An apparatus and method are provided for controlling a time deinterleaver for digital audio broadcasting (DAB) that reduces a required minimum memory capacity of a DAB receiver. The method and apparatus generate addresses for writing and reading interleaved data transmitted from a transmitter into/from a deinterleaver memory having a plurality of memory areas associated with a plurality of frames of the interleaved data. The apparatus comprises an encoder for outputting, upon receipt of frame information for a first set of frames, frame information for a second set of frames to write the first set of frames in unused memory areas, allocated for the second set of frames, out of the memory areas of the deinterleaver memory; and a ROM in which bit position information of the memory areas for the frames are written such that the memory areas for the first set of frames should not be overlapped with the memory areas for the second set of frames.

12 Claims, 6 Drawing Sheets

FIG. 2

| BIT | BIT REV | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 | 0 | (r-15) | (r-14) | (r-13) | (r-12) | (r-11) | (r-10) | (r-9) | (r-8) | (r-7) | (r-6) | (r-5) | (r-4) | (r-3) | (r-2) | (r-1) | (r-0) |
| 1 | 8 | | | | | | | | | (r-15) | (r-14) | (r-13) | (r-12) | (r-11) | (r-10) | (r-9) | (r-8) |
| 2 | 4 | | | | | (r-15) | (r-14) | (r-13) | (r-12) | (r-11) | (r-10) | (r-9) | (r-8) | (r-7) | (r-6) | (r-5) | (r-4) |
| 3 | 12 | | | | | | | | | | | | | (r-15) | (r-14) | (r-13) | (r-12) |
| 4 | 2 | | | (r-15) | (r-14) | (r-13) | (r-12) | (r-11) | (r-10) | (r-9) | (r-8) | (r-7) | (r-6) | (r-5) | (r-4) | (r-3) | (r-2) |
| 5 | 10 | | | | | | | | | | | (r-15) | (r-14) | (r-13) | (r-12) | (r-11) | (r-10) |
| 6 | 6 | | | | | | | (r-15) | (r-14) | (r-13) | (r-12) | (r-11) | (r-10) | (r-9) | (r-8) | (r-7) | (r-6) |
| 7 | 14 | | | | | | | | | | | | | | | (r-15) | (r-14) |
| 8 | 1 | | (r-15) | (r-14) | (r-13) | (r-12) | (r-11) | (r-10) | (r-9) | (r-8) | (r-7) | (r-6) | (r-5) | (r-4) | (r-3) | (r-2) | (r-1) |
| 9 | 9 | | | | | | | | | | (r-15) | (r-14) | (r-13) | (r-12) | (r-11) | (r-10) | (r-9) |
| 10 | 5 | | | | | | (r-15) | (r-14) | (r-13) | (r-12) | (r-11) | (r-10) | (r-9) | (r-8) | (r-7) | (r-6) | (r-5) |
| 11 | 13 | | | | | | | | | | | | | | (r-15) | (r-14) | (r-13) |
| 12 | 3 | | | | (r-15) | (r-14) | (r-13) | (r-12) | (r-11) | (r-10) | (r-9) | (r-8) | (r-7) | (r-6) | (r-5) | (r-4) | (r-3) |
| 13 | 11 | | | | | | | | | | | | (r-15) | (r-14) | (r-13) | (r-12) | (r-11) |
| 14 | 7 | | | | | | | | (r-15) | (r-14) | (r-13) | (r-12) | (r-11) | (r-10) | (r-9) | (r-8) | (r-7) |
| 15 | 15 | | | | | | | | | | | | | | | | (r-15) |

APPARATUS FOR CONTROLLING TIME DEINTERLEAVER MEMORY FOR DIGITAL AUDIO BROADCASTING

PRIORITY

This application claims priority to an application entitled "Apparatus for Controlling Time Deinterleaver Memory for Digital Audio Broadcasting" filed in the Korean Industrial Property Office on Aug. 30, 2000 and assigned Serial No. 2000-50700, the contents of which are hereby incorporated by reference.

BACKGROUND OF THE INVENTION

1. Field of the Invention

The present invention relates generally to a digital audio broadcasting (DAB) system, and in particular, to a method and apparatus for controlling a time deinterleaver memory in a DAB system.

2. Description of the Related Art

In a DAB system, a transmitter interleaves a signal before transmission and a receiver then deinterleaves the interleaved signal received from the transmitter. In the interleaving process, the transmitter sequentially writes transmission data in an interleaver memory, reads the written data in a predetermined sequence, and then transmits the read data. In this interleaving process called "time interleaving process", the data is delayed for up to 16 frames (1 frame=55296 bits), so that data input to the interleaver will be distributed over 16 frames when it is output. Therefore, to time-deinterleave the time-interleaved data, the receiver writes 16-frame data in a deinterleaver RAM (Random Access Memory) and then reads the written data according to a deinterleaving rule matched to the interleaving rule used in the transmitter.

FIG. 1 illustrates an address controller for generating addresses used to read and write data from and into a deinterleaver RAM to deinterleave the interleaved data transmitted from the transmitter in the DAB system. The address controller includes a counter 20, a bit inversion block 22, an A decoder 24, a B decoder 32, a ROM (Read Only Memory) 26, an adder 28 and a multiplier 30. In the deinterleaving process, the receiver writes the first received 16 frames in a deinterleaver RAM, and then writes a next received frame after reading one written frame. More specifically, the interleaved 16-frame data is first written in the deinterleaver RAM. Subsequently, the deinterleaver address controller generates a memory read address to read one data frame written in the deinterleaver RAM. The counter 20 counts data bits received at the deinterleaver. The B decoder 32 alternately switches between a read mode and a write mode in a frame unit, after the first 16 frames. In the read mode, the bit inversion block 22 bit-inverts a count value provided from the counter 20. The A decoder 24 decodes the bit-inverted binary value output from the bit inversion block 22 and outputs the decoded binary value to the ROM 26, in which position information of the data bits within one frame is written. The ROM 26 outputs position information of the data bits output from the A decoder 24. The multiplier 30 converts, in a bit unit, information on a value determined by performing a modulo-16 operation on a frame value (or frame number) to which the present data belongs. That is, the multiplier 30 generates a reference address used in reading a data bit from the deinterleaver RAM. The reference address is added by the adder 28 to the bit position information from the ROM 26, and the added value becomes the final read address to be used in reading the data written in the deinterleaver RAM. The deinterleaver reads out the data written in the deinterleaver memory according to the read address. After completion of performing the read process on one interleaved data frame, the deinterleaver is switched to the write mode by the B decoder 32 and writes one data frame. In this way, the deinterleaver alternates between the read mode and the write mode on a 1-frame unit basis, after the first 16 data frames.

For the time deinterleaving, the address controller needs a memory with a capacity sufficient to store the 16 data frames. If one symbol input to the deinterleaver is data subjected to 4-bit soft decision, 55296 bits×16 frames×4 bits=3.375 Mbits. In this case, the address controller requires a 4-Mbit memory. This means that the DAB receiver must include a 4-Mbit memory, increasing the cost of the product.

SUMMARY OF THE INVENTION

It is, therefore, an object of the present invention to provide a method and apparatus for controlling a time deinterleaver for digital audio broadcasting (DAB), capable of reducing a required minimum memory capacity of a DAB receiver.

To achieve the above and other objects, there is provided a method of generating addresses for writing and reading interleaved data in a deintervleaver memory, including the steps of associating preselected frames of the deinterleaver memory with each other to reduce a required memory capacity, calculating head positions of locations for the frames in the deinterleaver memory, and writing data bits into the deinterleaver memory at the calculated head positions. After all the frames are written into the deinterleaver memory, one frame is read from the plurality of frames and one frame is written to the deinterleaver memory for every frame read from the deinterleaver memory.

An apparatus is also provided for controlling a deinterleaver memory, the apparatus generating addresses for writing and reading interleaved data transmitted from a transmitter into/from the deinterleaver memory having a plurality of memory areas associated with a plurality of frames of the interleaved data. The apparatus comprises an encoder for outputting, upon receipt of frame information for a first set of frames, frame information for a second set of frames to write the first set of frames in unused memory areas, allocated for the second set of frames, out of the memory areas of the deinterleaver memory; and a ROM in which bit position information of the memory areas for the frames are written such that the memory areas for the first set of frames should not be overlapped with the memory areas for the second set of frames.

BRIEF DESCRIPTION OF THE DRAWINGS

The above and other objects, features and advantages of the present invention will become more apparent from the following detailed description when taken in conjunction with the accompanying drawings in which:

FIG. 2 is a diagram illustrating a conventional time deinterleaver memory map;

DETAILED DESCRIPTION OF THE PREFERRED EMBODIMENT

Figure 1:
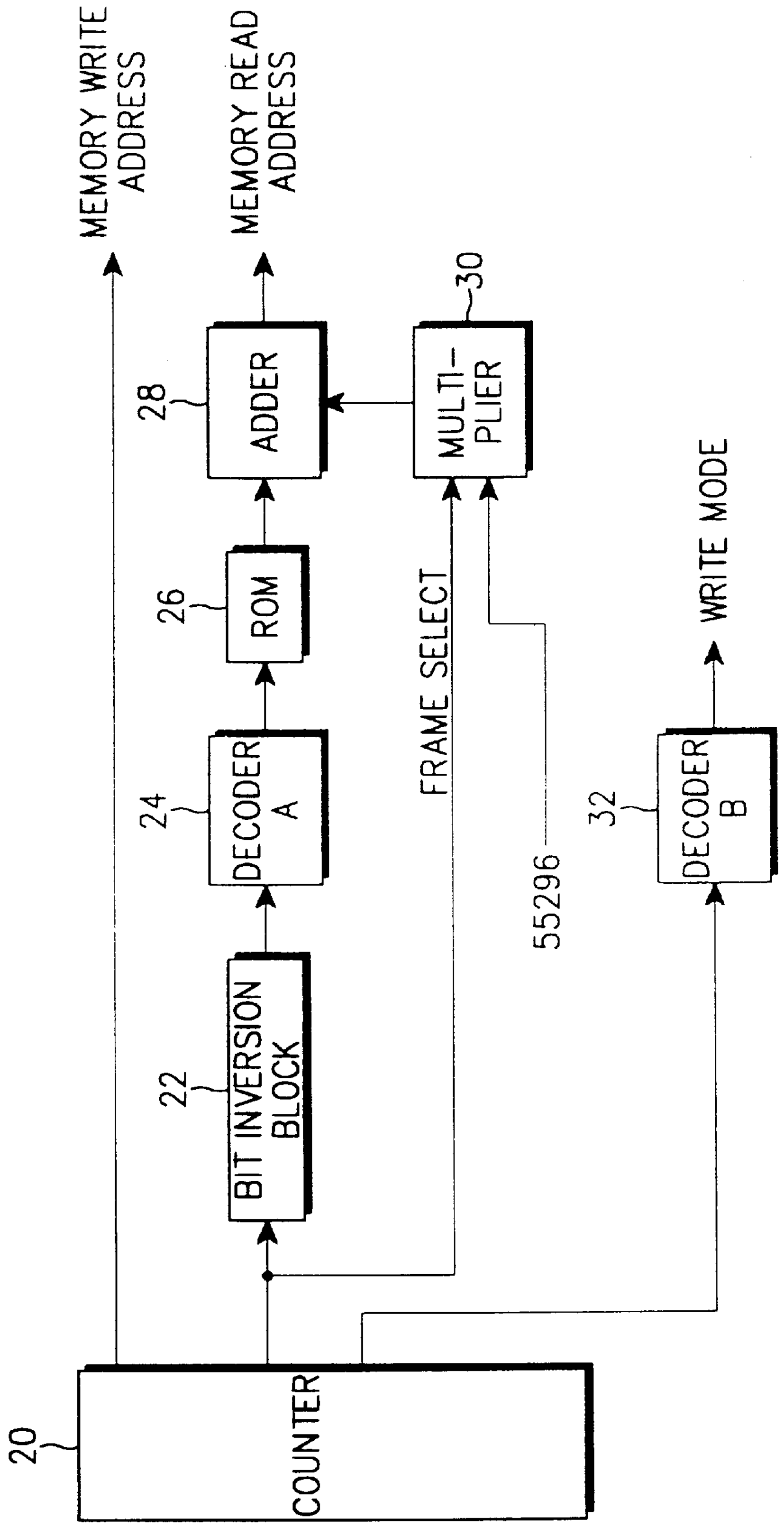
FIG. 1 is a block diagram illustrating an address controller for generating addresses used to read and write data from/into a common deinterleaver memory in a DAB system.

A preferred embodiment of the present invention will be described herein below with reference to the accompanying drawings. In the following description, well-known functions or constructions are not described in detail since they would obscure the invention in unnecessary detail.

FIG. 2 illustrates a common time deinterleaver memory map. The deinterleaving process will be described with reference to FIG. 2. A receiver receives interleaved data from a transmitter and writes the received interleaved data in a deinterleaver RAM. At this moment, the receiver writes the 16-frame interleaved data. The receiver extracts complete 1-frame data from the 16-frame data. That is, in the time deinterleaver RAM is written the 16-frame interleaved data transmitted from the transmitter, and the receiver reads the complete 1-frame data out of the 16-frame data distributed over the 16 frames. The reason for writing the first received 16-frame data in the deinterleaver memory is that it is possible to extract the normal 1-frame data from only the first 16 frames since the timer interleaver in the transmitter delays the transmission data over 16 frames before transmission. For example, the receiver may extract data bits of an $(r-15)^{th}$ frame from the time deinterleaver memory map shown in FIG. 2. Thereafter, the receiver writes the 1-frame interleaved data transmitted next from the transmitter in the time deinterleaver RAM and then reads 1-frame data (e.g., data bits of an $(r-14)^{th}$ frame in FIG. 2). The receiver performs the time deinterleaving in this manner.

Since, in the deinterleaving process, the receiver writes the interleaved data from the transmitter in the deinterleaver memory and then reads the written data, there may exist empty areas in the deinterleaver memory. An exemplary embodiment of the present invention performs deinterleaving using the empty memory areas, thereby reducing the required minimum memory capacity. More specifically, in the time deinterleaver RAM, the areas where the frame data is written are inversely symmetrized with the areas where the frame data is not written. That is, a frame #0 (or $0^{th}$ frame) uses only an area for a bit #0 (or $0^{th}$ bit) out of the memory areas for 16 bits, while a frame #14 does not use only an area for a bit #15 out of the memory areas for the 16 bits. Therefore, it is possible to write the data bits of the frame #14 in the unused memory areas for the frame #0. In addition, a frame #1 is associated with a frame #13 such that the frame #1 uses only the areas for the bits #0 and #8 out of the memory areas for the 16 bits, while the frame #13 does not use only the areas for the bits #15 and #7 out of the memory areas for the 16 bits. Therefore, the embodiment of the present invention uses the unused areas out of the memory areas allocated for the frames #0, #1, #2, #3, #4, #5 and #6 in writing the frames #14, #13, #12, #11, #10, #9 and #8. By doing so, it is possible to reduce the required minimum memory capacity by the memory capacity for the frames #14, #13, #12, #11, #10, #9 and #8.

Figure 3A:
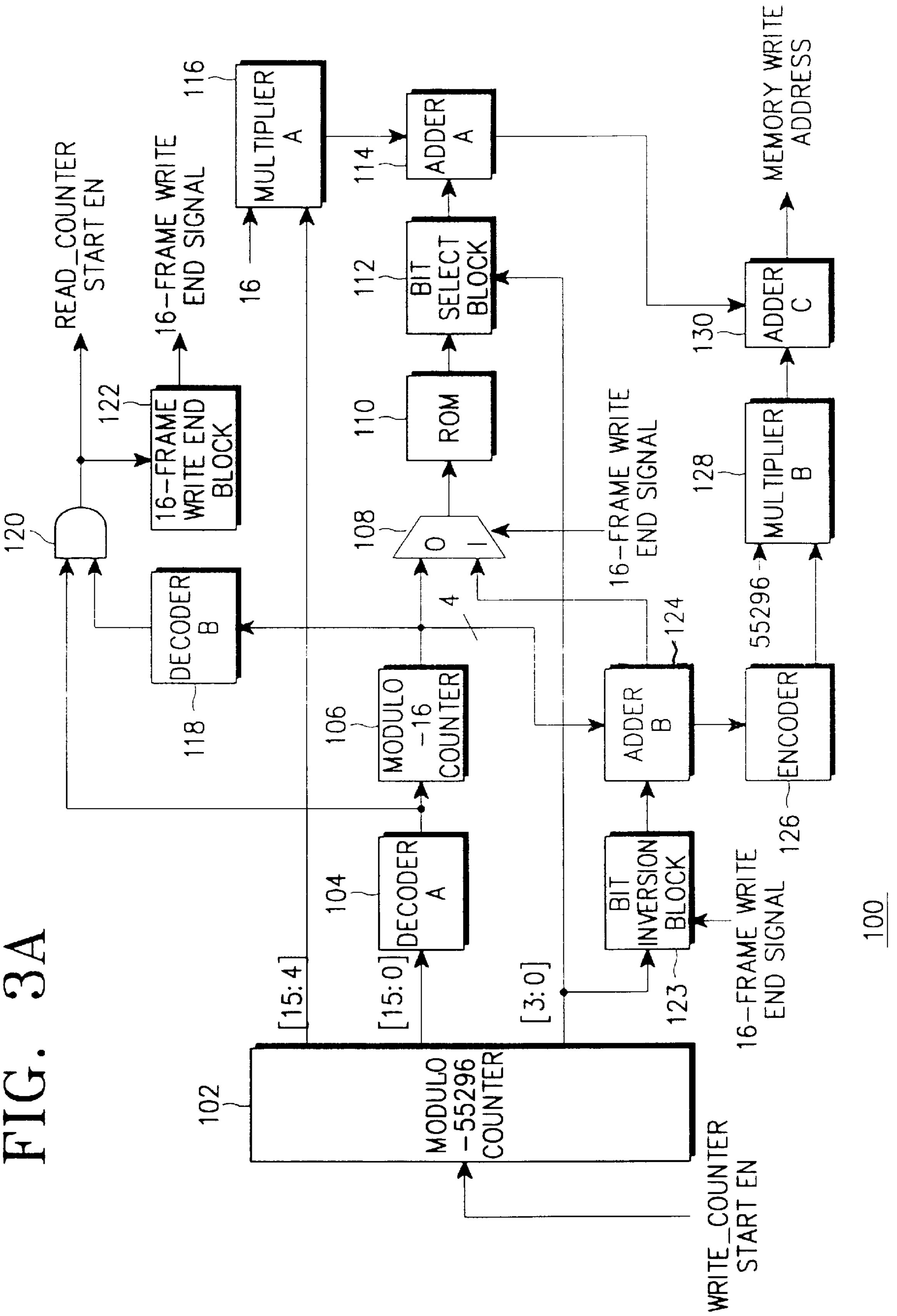
FIGS. 3A and 3B are block diagrams illustrating write and read address controllers for a time deinterleaver memory according to an embodiment of the present invention, respectively.
Figure 3B:
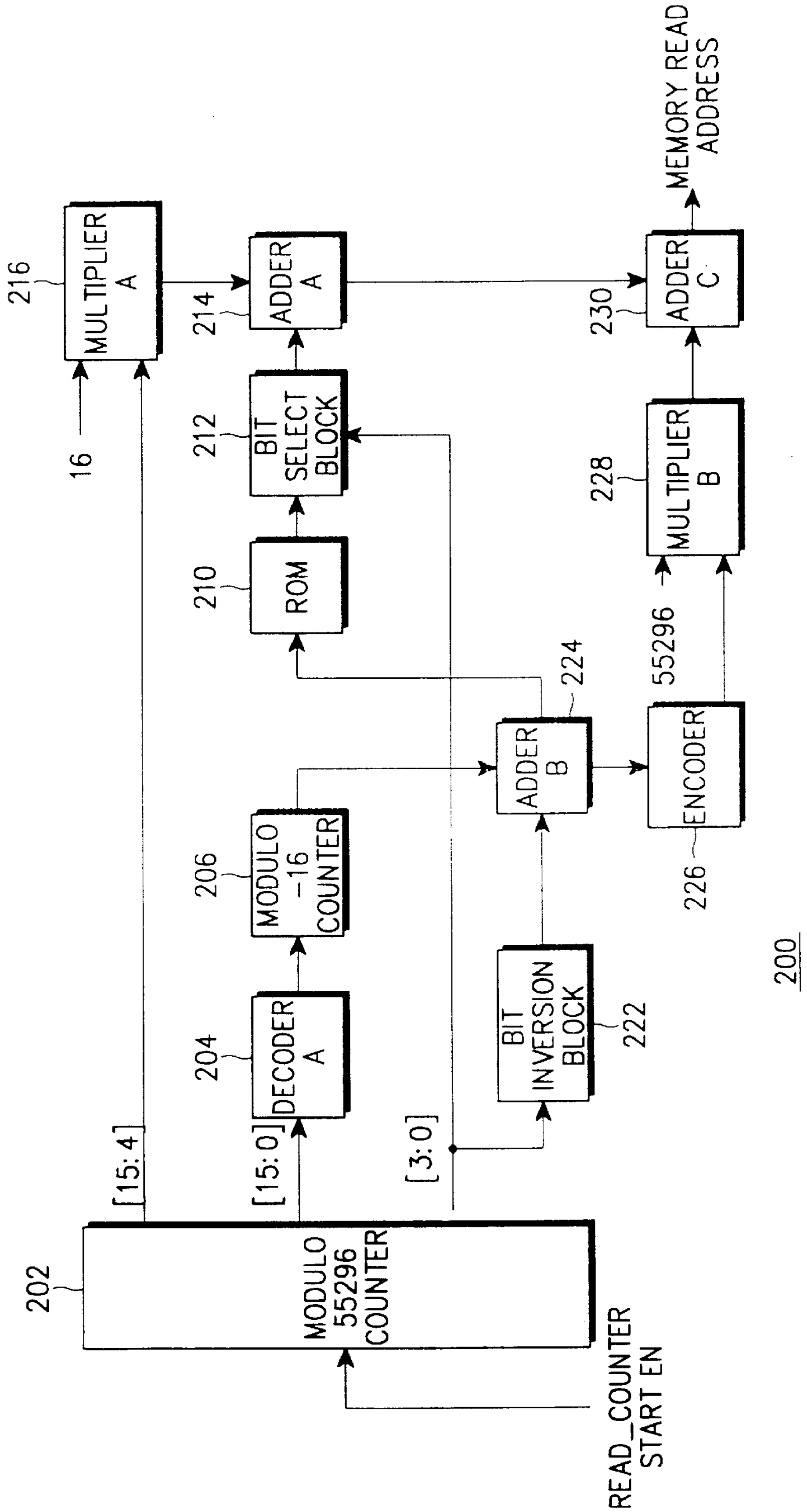
Figure 4:
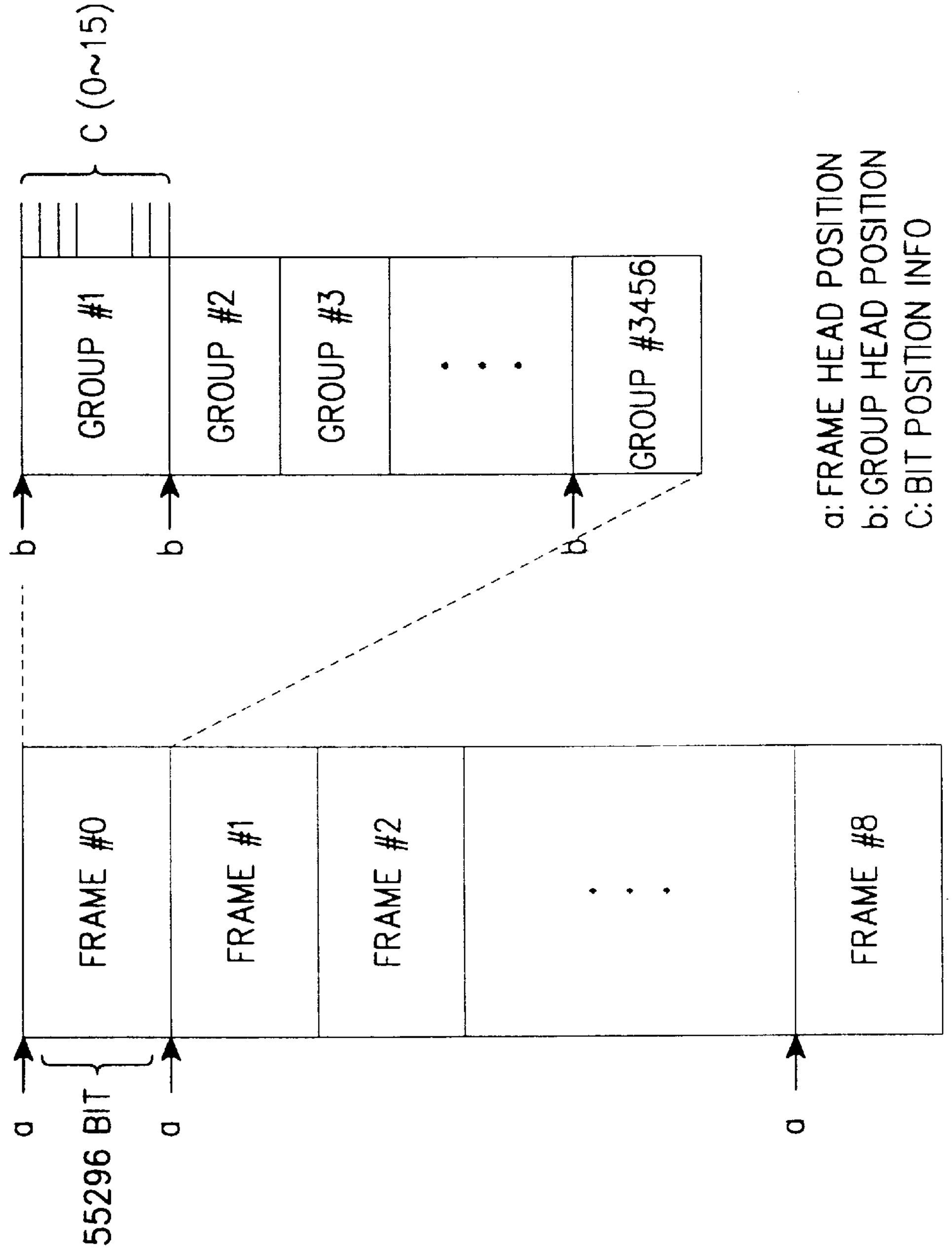
FIG. 4 is a diagram illustrating a deinterleaver memory to which the address controllers of FIGS. 3A and 3B are applicable.

FIGS. 3A and 3B illustrate write and read address controllers for the time deinterleaver memory according to an embodiment of the present invention, respectively. FIG. 4 illustrates a deinterleaver memory to which the address controllers of FIGS. 3A and 3B are applicable. The deinterleaver memory has memory areas associated with 9 data frames, wherein each data frame is divided into 3456 groups and each group is comprised of 16 bits. Since each data bit is subjected to 4-bit soft decision at the transmitter, it actually has a 4-bit size. Therefore, the deinterleaver memory of FIG. 4 has a size (or capacity) of 9 frames×55296 bits×4 bits. In the following description, each data bit having the 4-bit size will be assumed to be a data bit having a 1-bit size. for simplicity.

In FIG. 4, the deinterleaver memory has frame position information 'a' indicating 9 frame positions, group position information 'b' indicating 3456 groups of each frame, and bit position information 'c' indicating 16 bit positions of each group. Although the address controller according to an embodiment of the present invention is applied to the deinterleaver memory with a specific memory format, it would be obvious to those skilled in the art that the invention can also be applied to a memory with another format and that a modification in hardware structure may be made without departing from the spirit and scope of the invention.

Figure 5:
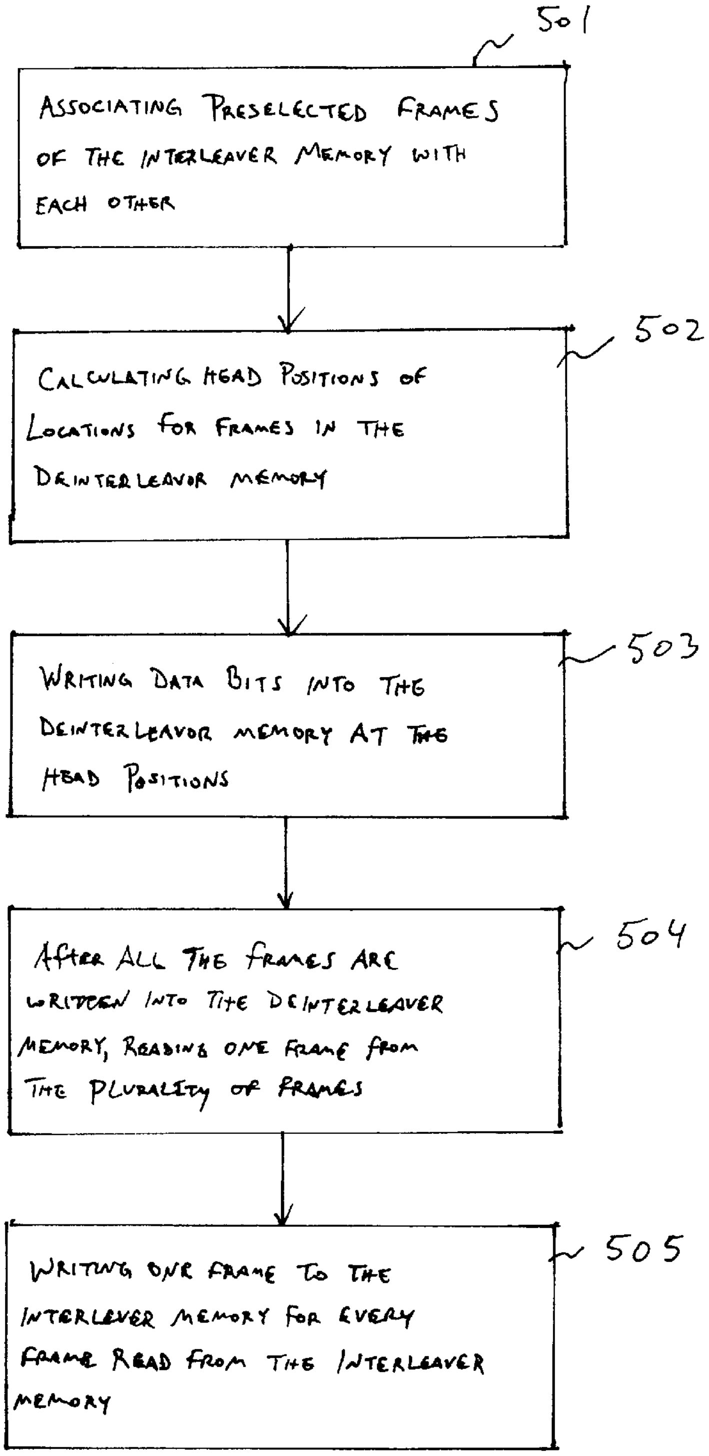
FIG. 5 is a diagram illustrating the steps of generating addresses for writing and reading data to the interleaver memory.

FIG. 5 illustrates the method of generating addresses for writing and reading interleaved data in a deintervleaver memory, including the steps of associating preselected frames of the deinterleaver memory with each other to reduce a required memory capacity (501), calculating head positions of locations for the frames in the deinterleaver memory (502), and writing data bits into the deinterleaver memory at the calculated head positions (503). After all the frames are written into the deinterleaver memory, one frame is read from the plurality of frames (504) and one frame is written to the deinterleaver memory for every frame read from the deinterleaver memory (505).

The address controller for the time deinterleaver memory includes a write address controller 100 shown in FIG. 3A and a read address controller 200 shown in FIG. 3B. The address controllers 100 and 200 control addresses for writing and reading data bits into/from the time deinterleaver memory. Now, an operation of the address controllers for the time deinterleaver memory according to an embodiment of the present invention will be described in connection with the sequence of time deinterleaving process.

First, the write address controller 100 shown in FIG. 3A generates a write address to be used in writing 16 interleaved data frames transmitted from the transmitter into the time deinterleaver RAM. The write address controller 100 includes a modulo-55296 write counter (or 55296-ary write counter) 102 for counting the data bits for one frame. At the start of the write mode, the write counter 102 outputs a [15:0] count value to an A decoder 104 in response to an enable signal received. The A decoder 104 decodes the last data bit of one frame output from the write counter 102. The one-frame data is comprised of 55296 bits. The last data bit of the one frame becomes a $55295^{th}$ bit (or $D7FFH_{16}$ in a 16-ary number). Although the A decoder 104 generates the enable signal in a frame unit in this embodiment, it will be understood by those skilled in the art that the enable signal can also be generated by the write counter 102 or another means.

The enable signal from the A decoder 104 is applied in common to a modulo-16 counter (or 16-ary counter) 106 and an AND gate 120. The modulo-16 counter 106 counts up using a signal output from the A decoder 104 as an enable signal of a modulo-16 up-counter. That is, that the modulo-16 counter 106 counts the output of the A decoder 104 sixteen times (in one-frame unit) is equivalent to counting the 16 data frames. A B decoder 118 decodes a count value 16 of the modulo-16 counter 106 and outputs the decoded value to the AND gate 120. The AND gate 120 outputs a read counter start enable signal READ_COUNTER_START_EN by ANDing the output of the A decoder 104 and the output of the B decoder 118. A 16-frame write end block 122 generates a 16-frame write end signal indicating completion of writing 16 data frames, depending on the output signal of the AND gate 120.

Since the modulo-16 counter 106 counts up in response to the enable signal output from the A decoder 104 in a frame unit, the output value of the modulo-16 counter 106 represents the sequence of the frames in a unit of 16 frames. For example, if the A decoder 104 outputs an enable signal for a 17$^{th}$ frame, the modulo-16 counter 106 outputs a signal '1', and then outputs a signal '2' for the next 18$^{th}$ frame. A multiplexer 108 selects the output of the modulo-16 counter 106 or the output of a B adder 124. The multiplexer 108 receives a 16-frame write end signal from the 16-frame write end block 122 and uses the received signal as an output select control signal. That is, the multiplexer 108 selects the output of the modulo-16 counter 106 before receiving the 16-frame write end signal, and selects the output of the B adder 124 upon receipt of the 16-frame write end signal.

For the 16$^{th}$ or earlier-than-16$^{th}$ data frame, the multiplexer 108 provides the output of the modulo-16 counter 106 to a ROM 110. The ROM 110 has a 16×64-bit size, wherein 16 indicates the number of frames and 64 indicates the number of bit positions in each frame. That is, in the ROM 110 is written data bit position information (or address) indicating positions of data bits in each frame in order to read and write the data transmitted from the transmitter from/into the deinterleaver RAM. Since the address controller according to the present invention is so constructed as to be able to save the time deinterleaver memory for DAB as compared with the conventional one, the data bit position information written in the ROM 110, unlike the prior art, has bit position values which are so changed as to be used in reading and writing the data from/into the memory in the present data sequence. The output of the modulo-16 counter 106 is used in selecting a frame corresponding to the data bit position information to be output from the ROM 110.

A bit select block 112 selects the 64-bit data bit position information for the corresponding frame from the ROM 110 in response to a [3:0] control signal output from the modulo-55296 write counter 102. Accordingly, the bit select block 112 sequentially outputs the bit position information from the 0$^{th}$ frame to the 15$^{th}$ frame according to the output of the modulo-16 counter 106, until before the 16$^{th}$ data frame.

Meanwhile, the output of the modulo-16 counter 106 is also provided to the B adder 124. The B adder 124 adds the output of a bit inversion block 123 to the output of the modulo-16 counter 106. However, since the bit inversion block 123 is enabled in response to the 16-frame write end signal, it outputs no signal for the 16$^{th}$ or later-than-16$^{th}$ frame. Therefore, the B adder 124 also outputs the intact count value from the modulo-16 counter 106, for the 16$^{th}$ or later-than-16$^{th}$ frame.

The address controller according to the present invention associates (or matches) memory areas in the deinterleaver memory for some frames with memory areas for other frames. For example, an encoder 126 is so constructed as to output 0$^{th}$-frame information upon receipt of the frame #14 (or 14$^{th}$ frame). Table 1 below shows the outputs of the encoder 126 for the inputs from the B adder 124.

TABLE 1

| Input | Output | Input | Output | Input | Output | Input | Output |
|---|---|---|---|---|---|---|---|
| 0 | 0 | 4 | 4 | 8 | 6 | 12 | 2 |
| 1 | 1 | 5 | 5 | 9 | 5 | 13 | 1 |
| 2 | 2 | 6 | 6 | 10 | 4 | 14 | 0 |
| 3 | 3 | 7 | 7 | 11 | 3 | 15 | 8 |

The outputs of the encoder 126 are applied to a B multiplier 128. The B multiplier 128 multiplies the respective frame values from the encoder 126 by 55296, thereby determining the head positions of the respective frames. For example, when the encoder 126 outputs a value indicating the frame #2, the B multiplier 128 multiplies the 55296 bits by the frame value 2, thereby outputting frame position information 'a' indicating the head of the frame #2 (see FIG. 4).

An A multiplier 116 multiplies 16 by a value determined by dividing 55296 data bits existing in one frame by 3456 groups, to generate group position information 'b' at each frame. The output of the A multiplier 116 is added by an A adder 114 to the output of the output of the ROM 110 selected by the bit select block 112. In other words, the group position information 'b' at each frame is added to the data bit position information 'c' at one frame. The output of the A adder 114 is added by a C adder 130 to the frame position information 'a' output from the B multiplier 128, generating a final memory write address. The time deinterleaver writes the data bits in the time deinterleaver RAM using this memory write address.

The time deinterleaver reads one-frame data from the deinterleaver RAM in which the 16-frame data is written in the foregoing manner, according to a deinterleaving rule matched to the interleaving rule used in the transmitter. The read address controller 200 of FIG. 3B generates a read address to be used in reading the data written in the time deinterleaver RAM. That is, the read address controller 200 provides a read address for reading the data bits of, for example, the (r-15)$^{th}$ frame from the time deinterleaver memory map shown in FIG. 2. This read address is generated according to the time deinterleaving rule.

The read address controller 200 shown in FIG. 3B includes a modulo-55296 read counter 202 having the same structure as the modulo-55296 write counter 102. The read counter 202 is activated in response to the read counter start enable signal generated from the AND gate 120 in the write address controller 100. When the read counter 202 counts the 55296$^{th}$ bit, an A decoder 204 decodes the count value received from the read counter 202 and generates a write counter start enable signal WRITE_COUNTER_START_EN to switch the operation mode of the time deinterleaver to the write mode. That is, the A decoder 204 switches from the write mode to the read mode, whenever one frame is counted. A modulo-16 counter 206 counts the output signal of the A decoder 204 as an enable signal of a modulo-16 up-counter, and provides the count value to a B adder 224. The B adder 224, connected to a bit inversion block 222 and the modulo-16 counter 206, adds the output of the bit inversion block 222 to the output of the modulo-16 counter 206. The bit inversion block 222 inverts the most significant bit (MSB) and the least significant bit (LSB) of a [3:0] bit position value output from the modulo-55296 read counter 202. For example, a bit position '0001' is changed to '1000', and a bit position '1100' is changed to '0011'. This relationship is shown in Table 2 below.

TABLE 2

| Input | Output | Input | Output | Input | Output | Input | Output |
|---|---|---|---|---|---|---|---|
| 0 | 0 | 4 | 2 | 8 | 1 | 12 | 3 |
| 1 | 8 | 5 | 10 | 9 | 9 | 13 | 11 |
| 2 | 4 | 6 | 6 | 10 | 5 | 14 | 7 |
| 3 | 12 | 7 | 14 | 11 | 13 | 15 | 15 |

The bit-inverted values output from the bit inversion block 222 are related to the time deinterleaving rule. The output of the bit inversion block 222 is added by the B adder 224 to the output of the modulo-16 counter 206, to provide frame information of the data bits to be read from the time deinterleaver RAM. This will be described in detail in connection with the time deinterleaving rule, with reference to FIG. 2. When 16 frames are written in the time deinterleaver RAM, it is possible to read one-frame data from the 16 frames. For example, in the time deinterleaver memory RAM shown in FIG. 2, the data of the (r-15)$^{th}$ frame must be read. For the data of the (r-15)$^{th}$ frame, the data bits #0, #1, #2 and #3 are written in the sequence of the frames #0, #8, #4, #12, . . . In other words, the bit inversion block 222 inverts the MSB and the LSB of the [3:0] data bit position value output from the read counter 202, thereby making it possible to determine the frame information where the (r-15)$^{th}$ frame data is written according to the respective data bits.

Meanwhile, after reading the data bits of the (r-15)$^{th}$ frame, the time deinterleaver writes one-frame data transmitted from the transmitter in the deinterleaver RAM. Then, the time deinterleaver reads the data bits of the (r-14)$^{th}$ frame. At this point, the positions of the data bits are shifted by one frame against the (r-15)$^{th}$ frame as shown in FIG. 2. In other words, when the time deinterleaver reads again the (r-14)$^{th}$-frame data after reading the (r-15)$^{th}$-frame data, the modulo-16 counter 206 outputs a count value '1'. This count value is added by the B adder 224 to the output value of the bit inversion block 222. Here, the bit inversion block 222 outputs the values 0, 8, 4, 12, . . . for the [3:0] output value from the read counter 202. The B adder 224 adds the output of the bit inversion block 222 to the output of the modulo-16 counter 206, outputting values 1, 9, 5, 13, . . . , which become frame information for reading the data of the (r-14)$^{th}$ frame. That is, the position of the (r-14)$^{th}$ data frame is shifted by one frame from the (r-15)$^{th}$ data frame. In conclusion, the output of the modulo-16 counter 206 represents a shifted amount of the frame position with regard to the output of the bit inversion block 222.

The frame position information from the B adder 224 is provided to a ROM 210 and an encoder 226. Since the ROM 210 and the encoder 226 have the same structure and the same operation as those of the ROM 110 and the encoder 126 in the write address controller 100, the detailed description of them will not be given. In addition, the other elements of the read address controller 200, i.e., a bit select block 212, an A adder 214, an A multiplier 216, a B multiplier 228, and a C adder 230 are also identical in structure and operation to the corresponding elements in the write address controller 100. Therefore, the detailed description of them will not be provided.

If the read address controller 200 generates a read address for reading one frame of the data written in the time deinterleaver RAM in this manner, the time deinterleaver reads one data frame. Then, the write address controller 100 generates a write address for writing one data frame in the time deinterleaver, and the position of the data bits to be written becomes the position where the one-frame data is previously read. Therefore, the write address controller 100 generates the write address in the same manner as the read address controller 200 generates the read address. That is, the write address controller 100 has almost the same structure as that of the read address controller 200, since the multiplexer 108 selects the output of the B adder 124 as an input to the ROM 110 after the 17$^{th}$ frame, and the bit inversion block 123 is enabled in response to the 16-frame write end signal. Therefore, an operation of the read address controller 200 after the 17$^{th}$ frame would be referred to the operation of the write address controller 100.

The novel time deinterleaver memory controller according to the present invention can write data bits of another frame in an area for one frame of the time deinterleaver memory. In the embodiment of the present invention, if one symbol input to the deinterleaver is data which was subjected to the 4-bit soft decision, 55296 bits×9 frames×4 bits 1.991 Mbits. Therefore, the deinterleaver RAM requires about 2-Mbit memory capacity, reduced by about 2 Mbits from 4 Mbits.

As described above, the novel time deinterleaver memory controller apparatus according to the present invention can reduce the required minimum memory capacity of the deinterleaver memory having memory areas for the interleaved data frames transmitted from the transmitter.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for controlling a deinterleaver memory, the apparatus generating addresses for writing and reading interleaved data transmitted from a transmitter into/from the deinterleaver memory having a plurality of memory areas associated with a plurality of frames of the interleaved data, the apparatus comprising:

an encoder that receives frame information for a first set of frames and outputs frame information for a second set of frames, wherein the first set of frames are written in unused memory areas of said deinterleaver memory previously allocated for the second set of frames; and a memory that stores bit position information of the memory areas for the frames such that the memory areas for the first set of frames are not overlapped with the memory areas for the second set of frames.

2. The apparatus as claimed in claim 1, wherein position information of the memory areas for the first set of frames is inversely symmetrized with position information of memory areas for the second set of frames.

3. The apparatus as claimed in claim 1, wherein the interleaved data is written in an area of said deinerleaver memory where data is read out.

4. The apparatus as claimed in claim 1, wherein the memory is a ROM (Read Only Memory).

5. The apparatus according to claim 1, wherein the size of the memory is less than 4-Mbits.

6. The apparatus according to claim 1, wherein bits of said first set of frames and bits of said second set of frames are written only in one of a column of a memory table of said memory and a row of said memory table of said memory.

7. A method of generating addresses for writing and reading interleaved data in a deinterleaver memory, comprising the steps of:

(a) associating preselected frames of the deinterleaver memory with each other to reduce a required memory capacity;

(b) calculating head positions of locations for the frames in the deinterleaver memory;

(c) writing data bits into the deinterleaver memory at the head positions calculated in step (b);

(d) after all the frames are written into the deinterleaver memory in step (c), reading one frame from the plurality of frames; and (e) writing one frame to the deinterleaver memory for every frame read from the deinterleaver memory, wherein a first set of frames are written in unused memory areas of said deinterleaver memory previously allocated for a second set of frames, and memory areas for the first set of frames are not overlapped with the memory areas previously allocated for the second set of frames.

8. The method as claimed in claim 7, wherein the frames in step (a) are associated by inversely symmetrizing a first set of frames with a second set of frames.

9. The method according to claim 7, wherein the required memory capacity is less than 4-Mbits.

10. The method according to claim 7, wherein bits of said first frame and bits of said second frame are written only in one of a column of a memory table of said deinterleaver memory and a row of said memory table of said deinterleaver memory.

11. An apparatus for controlling a deinterleaver memory, the apparatus generating addresses for writing and reading interleaved data transmitted from a transmitter into/from the deinterleaver memory having a plurality of memory areas associated with a plurality of frames of the interleaved data, the apparatus comprising:

an encoder that receives frame information for a first set of frames and outputs frame information for a second set of frames, wherein one of the first set of frames is written only in an unused memory area of said deinterleaver memory previously allocated for one of the second set of frames; and a memory that stores bit position information of the memory areas for the frames such that the memory areas for the first set of frames are not overlapped with the memory areas for the second set of frames.

12. A method of generating addresses for writing and reading interleaved data in a deinterleaver memory, comprising the steps of:

(a) associating preselected frames of the deinterleaver memory with each other to reduce a required memory capacity;

(b) calculating head positions of locations for the frames in the deinterleaver memory;

(c) writing data bits into the deinterleaver memory at the head positions calculated in step (b);

(d) after all the frames are written into the deinterleaver memory in step (c), reading one frame from the plurality of frames; and (e) writing one frame to the deinterleaver memory for every frame read from the deinterleaver memory, wherein a first frame is written only in an unused memory area of said deinterleaver memory previously allocated for a second frame, and the memory area for the first frame is not overlapped with the memory areas previously allocated for the second frame.

* * * * *